United States Patent
Choi

(10) Patent No.: US 8,543,292 B2
(45) Date of Patent: Sep. 24, 2013

(54) LANE MAINTENANCE CONTROL METHOD

(75) Inventor: Jae Bum Choi, Seoul (KR)

(73) Assignee: Mando Corporation, Pyeongtaek-Si (KR)

( * ) Notice: Subject to any disclaimer, the term of this patent is extended or adjusted under 35 U.S.C. 154(b) by 162 days.

(21) Appl. No.: 13/105,413

(22) Filed: May 11, 2011

(65) Prior Publication Data

US 2011/0282549 A1 Nov. 17, 2011

(30) Foreign Application Priority Data

May 13, 2010 (KR) .................. 10-2010-0044717

(51) Int. Cl.
*B60T 8/17* (2006.01)
*B60W 30/12* (2006.01)
*B60W 50/10* (2012.01)
*B60T 8/1755* (2006.01)

(52) U.S. Cl.
CPC ............... *B60W 30/12* (2013.01); *B60W 50/10* (2013.01); *B60T 2201/083* (2013.01); *B60T 8/17557* (2013.01)
USPC .......................................... 701/41

(58) Field of Classification Search
CPC ......... B60T 2201/083; B60T 8/17557; B60W 30/12; B60W 50/10
USPC .......................................... 701/41
See application file for complete search history.

(56) References Cited

U.S. PATENT DOCUMENTS

| 6,665,603 | B2 * | 12/2003 | Jindo et al. ................... 701/96 |
| 7,444,224 | B2 * | 10/2008 | Sadano et al. ................ 701/80 |
| 8,090,516 | B2 * | 1/2012 | Yonezawa et al. ............. 701/82 |
| 2010/0030430 | A1 * | 2/2010 | Hayakawa et al. ............. 701/42 |

FOREIGN PATENT DOCUMENTS

KR 10-2006-0007553 A 1/2006

OTHER PUBLICATIONS

Hayakawa et al., "Driver oriented path following in ITS: wide speed-range steering control by multiple look-ahead distances", IEEE/ASME International Conference on Advanced Intelligent Mechatronics, vol. 1, 2003, pp. 558-563.*

Zhao et al., "Vehicle lateral control and yaw stability control through differential braking", IEEE International Symposium on Industrial Electronics, vol. 1, Jul. 2006, pp. 384-389.*

* cited by examiner

*Primary Examiner* — James Trammell
*Assistant Examiner* — Todd Melton
(74) *Attorney, Agent, or Firm* — McDermott Will & Emery LLP

(57) ABSTRACT

Disclosed herein is a lane maintenance control method to control a vehicle to travel while accurately remaining in a given lane. The lane maintenance control method performs brake steering control in which, when a vehicle departs from a lane, a brake torque is applied to wheels of the vehicle close to the lane to generate an appropriate moment for lane maintenance, which allows the vehicle to finally move in an opposite direction of a direction in which the vehicle departs from the lane, resulting in accurate lane maintenance.

5 Claims, 5 Drawing Sheets

FIG. 5

| Right Pressure [bar] | Left pressure [bar] | | | | | |
|---|---|---|---|---|---|---|
| | 0 | 20 | 40 | 60 | 80 | 100 |
| 0 | 0 | 1.0 | 1.2 | 2.1 | 2.6 | 3.6 |

LANE MAINTENANCE CONTROL METHOD

CROSS-REFERENCE TO RELATED APPLICATION

This application claims the benefit of Korean Patent Application No. 2010-0044717, filed on May 13, 2010 in the Korean Intellectual Property Office, the disclosure of which is incorporated herein by reference.

BACKGROUND

1. Field

Embodiments of the present invention relate to a lane maintenance control method to control a vehicle to travel while remaining in a given lane.

2. Description of the Related Art

Generally, a maximum traveling speed of a vehicle increases in proportion to enhanced engine performance. Thus, to improve vehicle traveling stability and driver convenience, various driver assistant systems have been installed in vehicles. The driver assistant systems may be basically classified into safety systems and convenience systems.

First, safety systems include an Anti-lock Brake System (ABS) in which wheels are repeatedly locked and unlocked according to wheel slip during braking to achieve braking stability, a Traction Control System (TCS) to prevent slip of drive wheels during acceleration of a vehicle, an Electronic Stability Control (ESC) system as a combination of ABS and TCS to enhance vehicle stability, a Pre-Crash System (PCS) to alleviate collision shock, and the like.

Convenience systems include an Adaptive Cruise Control (ACC) system as a longitudinal traveling assistant device, a Lane maintenance System (LKS) as a transversal traveling assistant device, a Lane Departure Warning (LDW) system, and the like.

Of the aforementioned systems, LKS is a lane departure preventing system to assist a vehicle in remaining in a given lane by generating an appropriate moment when the vehicle departs from the lane. To this end, conventionally, steering control using Electric Power Steering (EPS) to supply assistive steering power using a motor when a driver manipulates a steering wheel has been performed. However, steering control is possible only in a vehicle provided with EPS and may confuse the driver.

SUMMARY

Therefore, it is an aspect of the present invention to provide a lane maintenance control method to assist a vehicle in accurately remaining in a given lane by generating an appropriate moment required for lane maintenance when the vehicle departs from the lane.

Additional aspects of the invention will be set forth in part in the description which follows and, in part, will be obvious from the description, or may be learned by practice of the invention.

In accordance with one aspect of the present invention, a lane maintenance control method includes recognizing information of a lane along which a vehicle travels, judging whether or not the vehicle departs from the lane based on the recognized lane information and transversal deviation of the vehicle, determining a look ahead distance required for lane maintenance if the vehicle departs from the lane, calculating a target moment based on the look ahead distance, and applying a brake torque to a wheel to generate the calculated target moment, thereby changing a direction of the vehicle.

The application of the brake torque to the wheel may include applying a brake torque to a wheel close to the lane to generate the target moment.

The application of the brake torque to the wheel may include distributing different torques to left and right wheels of the vehicle to generate the target moment.

The lane maintenance control method may further include stopping brake steering control, in which the direction of the vehicle is changed as the brake torque is applied to the wheel of the vehicle, if turn signal is turned on.

The lane maintenance control method may further include stopping brake steering control, in which the direction of the vehicle is changed as the brake torque is applied to the wheel of the vehicle, if driver steering input exceeds a predetermined range.

BRIEF DESCRIPTION OF THE DRAWINGS

These and/or other aspects of the invention will become apparent and more readily appreciated from the following description of the embodiments, taken in conjunction with the accompanying drawings of which:

FIG. 5 is a table illustrating yaw rate variation when the lane maintenance system according to the embodiment of the present invention distributes different brake pressures to left and right wheels of a vehicle.

DETAILED DESCRIPTION

Figure 1:
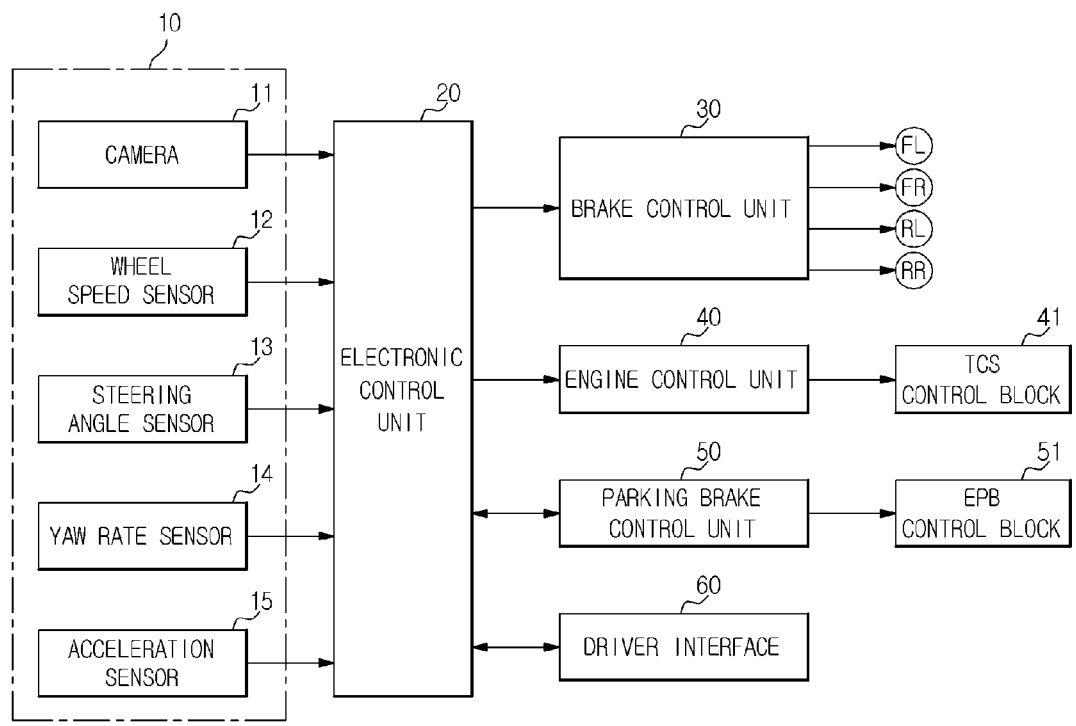
FIG. 1 is a block diagram of a lane maintenance system according to an embodiment of the present invention.

Reference will now be made in detail to the embodiments of the present invention, examples of which are illustrated in the accompanying drawings, wherein like reference numerals refer to like elements throughout.

FIG. 1 is a block diagram of a lane maintenance system according to the embodiment of the present invention.

In FIG. 1, the lane maintenance system according to the embodiment of the present invention includes a sensor unit 10, an electronic control unit 20, a brake control unit 30, an engine control unit 40, a parking brake control unit 50, and a driver interface 60.

The sensor unit 10 serves to collect various sensor information of a vehicle and includes a camera 11, a wheel speed sensor 12, a steering angle sensor 13, a yaw rate sensor 14, and an acceleration sensor 15.

The camera 11 photographs a direction in which a vehicle travels to recognize a lane and transmits the photographed signal to the electronic control unit 20. The wheel speed sensor 12 is installed to each of wheels FL, FR, RL and RR to sense a speed of the corresponding wheel and transmits the sensed signal to the electronic control unit 20.

The steering angle sensor 13 is provided at a steering wheel column. The steering angle sensor 13 senses a steering angle and angular speed depending on manipulation of a steering wheel and transmits the sensed signal to the electronic control unit 20.

The yaw rate sensor 14 senses a yaw rate (cornering speed) of a vehicle and transmits the sensed signal to the electronic control unit 20.

The acceleration sensor 15 senses a longitudinal or transversal vehicle acceleration and transmits the sensed signal to the electronic control unit 20.

The electronic control unit 20 judges whether or not a vehicle departs from a lane upon receiving the signals transmitted from the camera 11, the wheel speed sensor 12, the steering angle sensor 13, the yaw rate sensor 14 and the acceleration sensor 15. If it is judged that the vehicle departs from the lane, the electronic control unit 20 determines a look ahead distance L required for lane maintenance, and then calculates a target moment M required for lane maintenance by the following Equation 1.

$$M=2\{(F_{FL}+F_{RL})-(F_{FR}+F_{RR})\}/T_r \qquad \text{Equation 1}$$

Here, "$F_{FL}$" is brake torque of a left front wheel FL, "$F_{RL}$" is a brake torque of a left rear wheel RL, "$F_{FR}$" is brake torque of a right front wheel FR, "$F_{RR}$" is brake torque of a right rear wheel RR, and "$T_r$" is a distance between the front wheels FL and FR or between the rear wheels RL and RR.

In Equation 1, a value of the target moment M varies based on the look ahead distance L. The look ahead distance L is a forward traveling distance, required for lane maintenance, based on a vehicle speed. The look ahead distance L is a design variant of a target distance to prevent a vehicle from departing from a lane without confusing a driver.

Thus, the value of the target moment M decreases if the look ahead distance L is long, and increases if the look ahead distance L is short.

To this end, if it is judged that a vehicle departs from a lane, the electronic control unit 20 applies appropriate brake torque to each wheel FL, FR, RL or RR to generate the calculated target moment M. Specifically, the electronic control unit 20 generates the moment by applying brake torque to wheels close to a lane, thereby controlling the vehicle to finally move an opposite direction of a direction in which the vehicle departs the lane.

During this brake steering control, the electronic control unit 20 judges whether or not turn signal is turned on or whether or not driver steering input exceeds a predetermined range. If the turn signal is turned on or the driver steering input exceeds the predetermined range, the electronic control unit 20 stops brake steering control based on driver steering intention.

The brake control unit 30 controls brake pressure applied to a wheel cylinder based on a brake signal output from the electronic control unit 20, thereby applying brake torque to the respective wheels FL, FR, RL and RR to maximize vehicle stability.

The engine control unit 40 controls engine torque based on an engine control signal output from the electronic control unit 20, thereby controlling drive force of an engine in cooperation with a Traction Control System (TCS) control block 41 to maximize vehicle stability.

The parking brake control unit 50 additionally applies constant brake force to rear wheels RR and RL based on a parking brake control signal output from the electronic control unit 20, thereby distributing brake force in cooperation with an Electronic Parking Brake (EPB) control block 51 to optimize the brake force of the vehicle.

An EPB system to allow a motor to automatically operate a parking brake based on operating states of a vehicle functions to automatically operate or release the parking brake in cooperation with the electronic control unit 20, thereby achieving braking stability in an emergency. The EPB system receives additional brake force operation information of the rear wheels RR and RL from the electronic control unit 20 via CAN communication, thereby additionally applying a constant brake force to the rear wheels RR and RL so as to optimize the brake force of the vehicle.

The driver interface 60 serves as a communication interface with a driver with relation to the beginning of adaptive cruise control, adaptive cruise control modes and control states (e.g., when turn signal is turned on) and transmits an input signal preset by a driver to the electronic control unit 20.

Hereinafter, operation and effects of a lane maintenance control method using the above described lane maintenance system will be described.

Figure 2:
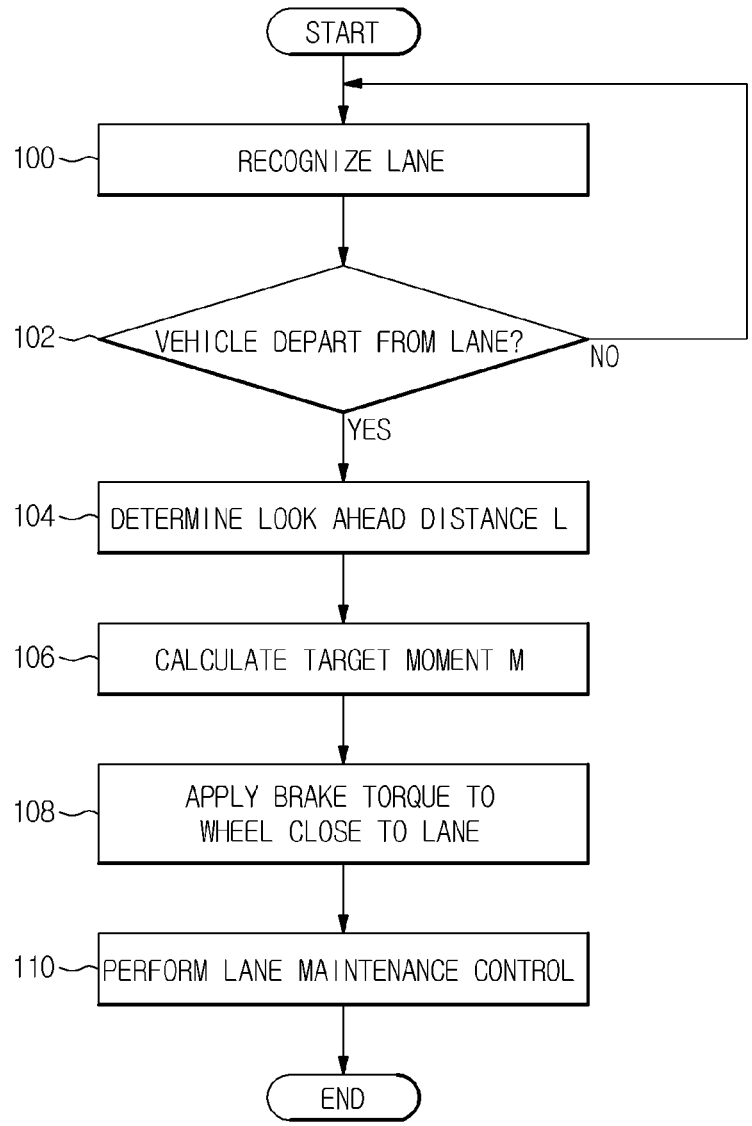
FIG. 2 is a flow chart illustrating a lane maintenance control method of a vehicle according to an embodiment of the present invention.
Figure 3:
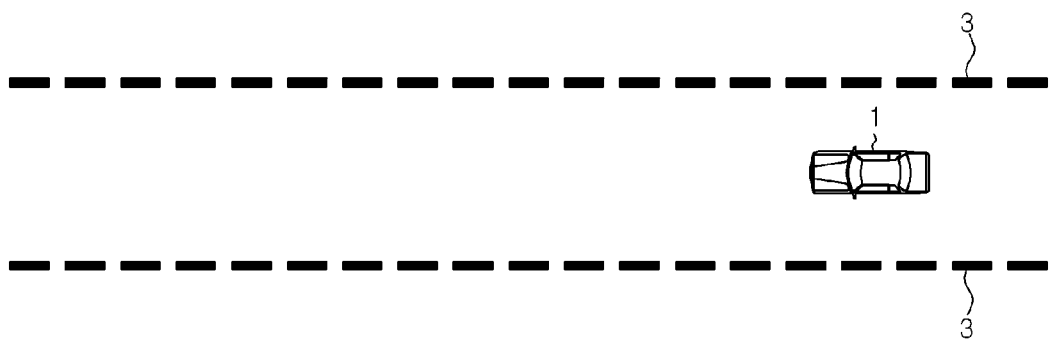
FIG. 3 is a view illustrating operation of the lane maintenance system according to the embodiment of the present invention during lane maintenance.
Figure 4:
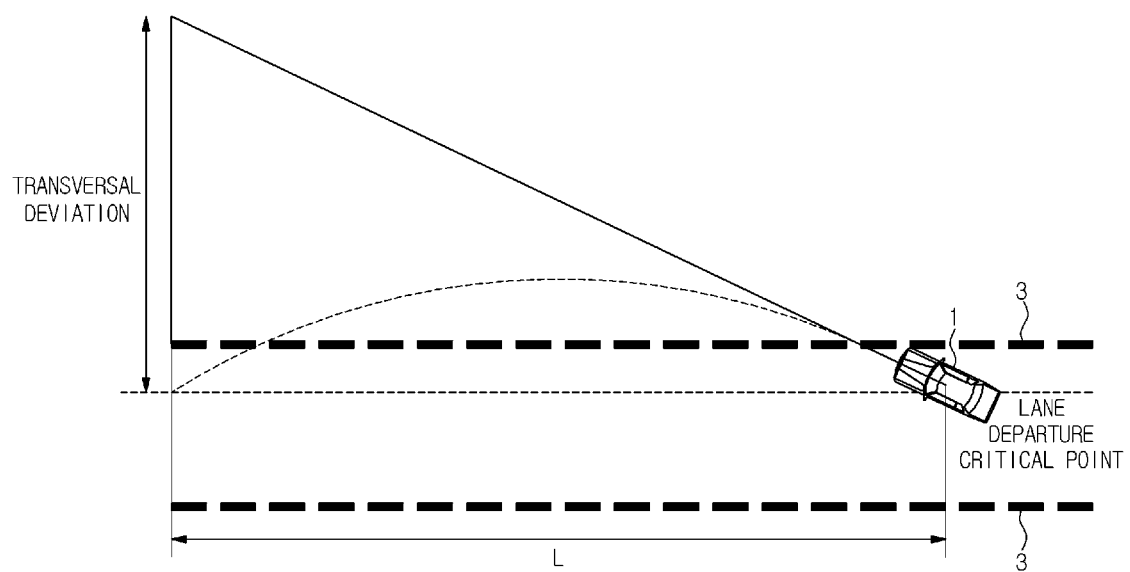
FIG. 4 is a view illustrating the lane maintenance system according to the embodiment of the present invention when a vehicle departs from a lane.

FIG. 2 is a flow chart illustrating the lane maintenance control method according to the embodiment of the present invention, FIG. 3 is a view illustrating operation of the lane maintenance system according to the embodiment of the present invention during lane maintenance, and FIG. 4 is a view illustrating the lane maintenance system according to the embodiment of the present invention when a vehicle departs from a lane.

In FIG. 2, if a vehicle 1 begins to travel inside lanes 3 located at opposite sides of a motorway (see FIG. 3), the camera 11 photographs a direction in which the vehicle 1 travels to recognize the lanes 3, and transmits recognized information of the lanes 3 to the electronic control unit 20 (100).

Thus, the electronic control unit 20 judges whether or not the vehicle 1 departs from the lane 3 as illustrated in FIG. 4 based on information of the lanes 3 recognized by the camera 11 and transversal deviation of the vehicle 1 (102).

If it is judged from the result of operation 102 that the vehicle departs from the lane 3, the electronic control unit 20, as illustrated in FIG. 4, determines a look ahead distance L required for lane maintenance (104).

If the look ahead distance L required for lane maintenance is determined, the electronic control unit 20 calculates a target moment M, which can cause the vehicle to maintain a lane based on the look ahead distance L by the following Equation 1 (106).

$$M=2\{(F_{FL}+F_{RL})-(F_{FR}+F_{RR})\}/T_r \qquad \text{Equation 1}$$

Here, "$F_{FL}$" is brake torque of a left front wheel FL, "$F_{RL}$" is brake torque of a left rear wheel RL, "$F_{FR}$" is brake torque of a right front wheel FR, "$F_{RR}$" is brake torque of a right rear wheel RR, and "$T_r$" is a distance between the front wheels FL and FR or between the rear wheels RL and RR.

In Equation 1, a value of the target moment M decreases if the look ahead distance L is long, and increases if the look ahead distance L is short.

Thereafter, the electronic control unit 20 applies appropriate brake torque to each wheel FL, FR, RL or RR to generate the calculated target moment M. More particularly, the electronic control unit 20 applies brake torque to wheels close to the lane 3 to generate the target moment M (108).

Thus, the electronic control unit 20 controls the vehicle 1 to finally move in an opposite direction of a direction in which the vehicle 1 departs from the lane 3, thereby controlling the vehicle 1 to remain inside the lane 3 (110).

A method to apply appropriate brake torque to each wheel FL, FR, RL or RR, as illustrated in FIG. 5, includes distributing different torques at left and right wheels of the vehicle 1 to generate the target moment M.

FIG. 5 is a table illustrating yaw rate variation when the lane maintenance system according to the embodiment of the present invention distributes different brake pressures to left and right wheels of a vehicle.

In FIG. 5, assuming that the same brake pressure of 0 bars is applied to the left wheels FL and RL and different brake pressures of 0, 20, 40, 60, 80 and 100 bars are distributed to the right wheels FR and RR, it will be appreciated that a yaw rate varies in a range of 0, 1.0, 1.2, 2.1, 2.6, 3.6.

As will be appreciated from FIG. 5, when brakes pressure different from that applied to the right wheels FR and RR is applied to the left wheels FL and RL to generate the target moment M, brake steering control to finally change a direction of the vehicle 1 may be performed.

During the above described brake steering control, if turn signal is turned on or driver steering input exceeds a predetermined range, the electronic control unit 20 stops the brake steering control based on driver steering intention.

As is apparent from the above description, with a lane maintenance control method according to the embodiment of the present invention, when a vehicle departs from a lane, brake torque is applied to wheels of the vehicle close to the lane to generate an appropriate moment for lane maintenance, which allows the vehicle to finally move an opposite direction of a direction in which the vehicle departs from the lane, resulting in accurate lane maintenance.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A lane maintenance control method, comprising:
    obtaining information of a lane along which a vehicle travels;
    judging whether or not the vehicle departs from the lane based on the obtained lane information and transversal deviation of the vehicle;
    determining a look ahead distance required for lane maintenance when it is judged that the vehicle departs from the lane;
    calculating a target moment based on the look ahead distance such that a first value of the target moment calculated based on a first value of the look ahead distance is greater than a second value of the target moment calculated based on a second value of the look ahead distance that is smaller than the first value of the look ahead distance; and
    applying a brake torque to a wheel to generate the calculated target moment, thereby changing a direction of the vehicle.

2. The method according to claim 1, wherein the application of the brake torque to the wheel includes applying a brake torque to a wheel close to the lane to generate the target moment.

3. The method according to claim 2, wherein the application of the brake torque to the wheel includes distributing different torques to left and right wheels of the vehicle to generate the target moment.

4. The method according to claim 1, further comprising:
    stopping, when a turn signal is turned on, a brake steering control, in which the direction of the vehicle is changed as the brake torque is applied to the wheel of the vehicle.

5. The method according to claim 1, further comprising:
    stopping, when a driver steering input exceeds a predetermined range, a brake steering control, in which the direction of the vehicle is changed as the brake torque is applied to the wheel of the vehicle.

* * * * *